United States Patent
Kaplan et al.

(10) Patent No.: US 9,311,051 B2
(45) Date of Patent: Apr. 12, 2016

(54) HARDWARE RANDOM NUMBER GENERATOR

(71) Applicant: Advanced Micro Devices, Inc., Sunnyvale, CA (US)

(72) Inventors: David A. Kaplan, Austin, TX (US); Winthrop J. Wu, Shrewsbury, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 318 days.

(21) Appl. No.: 13/738,899

(22) Filed: Jan. 10, 2013

(65) Prior Publication Data

US 2014/0195576 A1    Jul. 10, 2014

(51) Int. Cl.
*G06F 1/02* (2006.01)
*G06F 7/58* (2006.01)

(52) U.S. Cl.
CPC ..................................... *G06F 7/588* (2013.01)

(58) Field of Classification Search
USPC ................................................. 708/250–256
See application file for complete search history.

(56) References Cited

U.S. PATENT DOCUMENTS

| | | | | |
|---|---|---|---|---|
| 6,240,432 | B1* | 5/2001 | Chuang et al. | 708/252 |
| 7,219,113 | B2* | 5/2007 | Bonaccio et al. | 708/250 |
| 8,321,773 | B1* | 11/2012 | Pedersen | 714/799 |
| 8,489,660 | B2* | 7/2013 | Herbert et al. | 708/251 |
| 2008/0076525 | A1* | 3/2008 | Kim | 463/22 |
| 2010/0281088 | A1* | 11/2010 | Wilber | 708/251 |
| 2013/0018934 | A1* | 1/2013 | Kim et al. | 708/252 |
| 2013/0073598 | A1* | 3/2013 | Jacobson et al. | 708/252 |
| 2014/0108478 | A1* | 4/2014 | Lee et al. | 708/250 |

OTHER PUBLICATIONS

Intel Digital Random Number Generator Software Implementation Guide, Revision 1.1, Aug. 7, 2012, p. 16.*

* cited by examiner

*Primary Examiner* — Tan V. Mai
(74) *Attorney, Agent, or Firm* — Liang & Cheng, PC (57) ABSTRACT

A random number generator may include an input configured to receive a plurality of entropy bits generated by an entropy source of a random number generator, wherein the random number generator is configured to generate a plurality of random numbers; and an entropy health monitor coupled with the input, wherein the entropy health monitor is configured to perform a corrective action based on the plurality of entropy bits.

20 Claims, 7 Drawing Sheets

HARDWARE RANDOM NUMBER GENERATOR

TECHNICAL FIELD

This disclosure relates to the field of random number generation and, in particular, to a hardware random number generator.

BACKGROUND

Many modern computing systems utilize random number generators for a variety of applications, including but not limited to games, signal and image processing, modeling of financial and scientific systems, equation solving, and computer security and cryptography. A random number generator operating within such a computing system may generate a series of random numbers as a sequence of independent numbers falling within a given range of values, and with a specified distribution within that range. An ideal random number generator provides a stream of uniformly distributed, non-deterministic, independent bits having high entropy.

In some computing systems, a random number generator may be implemented in software. Such software random number generators often generate a sequence of numbers that is ultimately deterministic and are thus better characterized as pseudo random number generators; however, these solutions may utilize various techniques to decrease the predictability of the generated numbers. For example, the random number generator may utilize data from the system clock, keystroke timing, mouse movements, etc., and incorporate this data into the random number calculations to render the output random number more unpredictable.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

High quality random number generation is a critical part of many security applications, including key generation, elliptic curve cryptography (ECC), high-bandwidth digital content protection (HDCP), encryption, and other applications. Poor quality random numbers, which have low entropy and are predictable, may lead to security breaches and compromised systems.

Some applications, including but not limited to access control, identification, encryption, audio noise generation, etc., may benefit from a random number generator capable of generating truly random numbers, rather than pseudo random numbers. For these applications a hardware number generator may be used that generates random numbers based on a natural source of noise.

Figure 1:
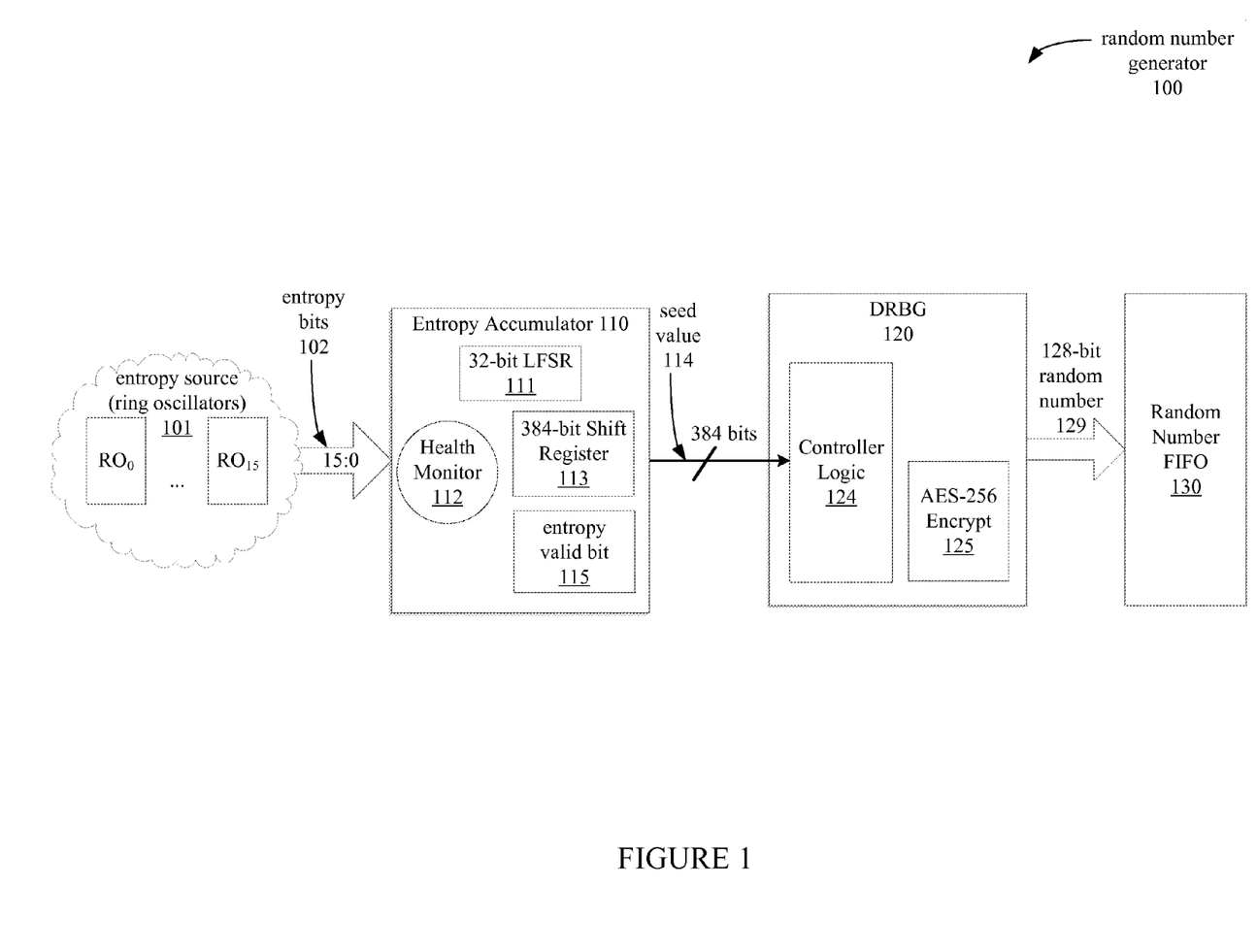
FIG. 1 illustrates an embodiment of a random number generator.

One embodiment of a hardware random number generator may generate random numbers based on a natural entropy source. FIG. 1 illustrates an embodiment of a hardware random number generator 100 that may include an entropy accumulator 110, a deterministic random bit generator (DRBG) 120, and a health monitor 112 to monitor the entropy of the random numbers produced by the random number generator 100. The random number generator 100 may accumulate raw entropy, which may be of mediocre quality, to generate high entropy random numbers. Such random numbers may be used to implement processor instructions such as, for example, the x86 RDRAND instruction.

In one embodiment, random number generator 100 includes an entropy accumulator block 110. In one embodiment, entropy accumulator 110 may have an input to receive raw input entropy 102 from an entropy source 101, which includes ring oscillators $RO_0$-$RO_{15}$. In an alternative embodiment, other types of entropy sources may be used, such as meta-stable circuits. The entropy accumulator 110 accumulates the received entropy 102 over time to generate a seed value 114. In one embodiment, the entropy accumulator 110 may be implemented using a 32-bit linear feedback shift register (LFSR) 111 that performs an XOR operation on the bits of the input entropy 102 and the bits stored in the LFSR 111. In one embodiment, the LFSR 111 may be run for multiple cycles to increase the randomness of the seed value 114, with XOR operations being performed on any new input entropy bits 102 and the bits stored in the LFSR 111.

In one embodiment, the number of cycles for which the LFSR 111 is allowed to accumulate entropy in this manner may be configured at or before runtime. Once this configurable number of entropy accumulation cycles has been reached, the seed value in the LFSR 111 may be appended to a shift register 113 that is used to store seed values for seeding the next stage 120 of the random number generator 100. In an alternative embodiment, an XOR operation may be performed on the value in the LFSR 111 and bits in a subset of the shift register 113 storing the seed values.

One embodiment of a random number generator 100 may also include a health monitor 112 to detect external tampering with the random number generator 100. In one embodiment, during the operation of the entropy accumulator 110, the input entropy 102 may be checked for bias which may indicate deliberate tampering. A skilled hacker might be able to modify the chip in which the random number generator is implemented in such a way that the entropy source 101 (e.g. ring oscillators) becomes non-random, or possibly even constant. This sort of tampering would result in poor quality deterministic, rather than random, numbers.

In one embodiment, a health monitor 112 may perform health checks to monitor the entropy of the random numbers being generated and may perform some action in response to detecting a loss of entropy. For example, the health monitor 112 may cause the random number generator 100 to cease generation of random numbers in response to detecting entropy that is outside an acceptable range.

One embodiment of a health monitor 112 may perform two sets of health checks every X cycles: a first set of individual health checks and a second set of overall health checks. In one embodiment, the number of cycles X may be a configurable value; for example, the health monitor 112 may be configured to perform the health checks every 256 cycles. In one embodiment, an individual health check may monitor each bit of input entropy received from a single ring oscillator to check for bias in that ring oscillator. For example, the individual health check process may count the numbers of ones received from the ring oscillator within the 256 cycle window and compare the number of ones with an upper and a lower limit.

In one embodiment, an overall health check may look for bias in the full set of input entropy. For example, an overall health check process may count the total number of ones received within the entire set of entropy bits 102, generated by all of the ring oscillators $RO_0$-$RO_{15}$, and compare the number of ones with an upper and lower limit. For both the individual and overall health checks, the upper and lower limits may represent an acceptable proportion of ones to zeros, and may be fixed or programmed at runtime. In an alternative embodiment, the health checks may count the number of zeros to determine whether the number of zeros falls within the acceptable range, instead of counting the number of ones; either logic state may be used.

In one embodiment, if any of the health checks fail (e.g., the number of ones or zeros exceeds the acceptable range), the random number generator 100 may start a counter that increments until the health check passes. In one embodiment, the random number generator 100 may stop generating random numbers if this counter reaches a maximum value, indicating that entropy of acceptable quality has not been generated for a predetermined amount of time, or a predetermined number of cycles.

In one embodiment, the combination of an entropy accumulator block with a National Institute of Standards and Technology (NIST) compliant deterministic random bit generator (DRBG) may be used to generate a series of random numbers at a fast rate. In one embodiment, the entropy accumulator 110 outputs a seed value 114 that includes 384 bits. The seed value 114 may be used in a NIST Special Publication 800-90 DRBG 120. In one embodiment, this DRBG 120 may be a pseudo random number generator that uses an AES-256 encryption block 125 to generate a 128-bit random value 129; an alternative embodiment may utilize another type of DRBG, such as a DRBG that is based on SHA or other AES lengths. In one embodiment, the DRBG 120 may periodically reseed itself with a new seed value 114 from the entropy accumulator 110.

Although in one embodiment the DRBG 120 may be capable of high throughput, its output may also be buffered in a random number first-in-first-out (FIFO) buffer 130 to satisfy bursty read traffic, which may occur when many read operations occur within a short time period.

Figure 2:
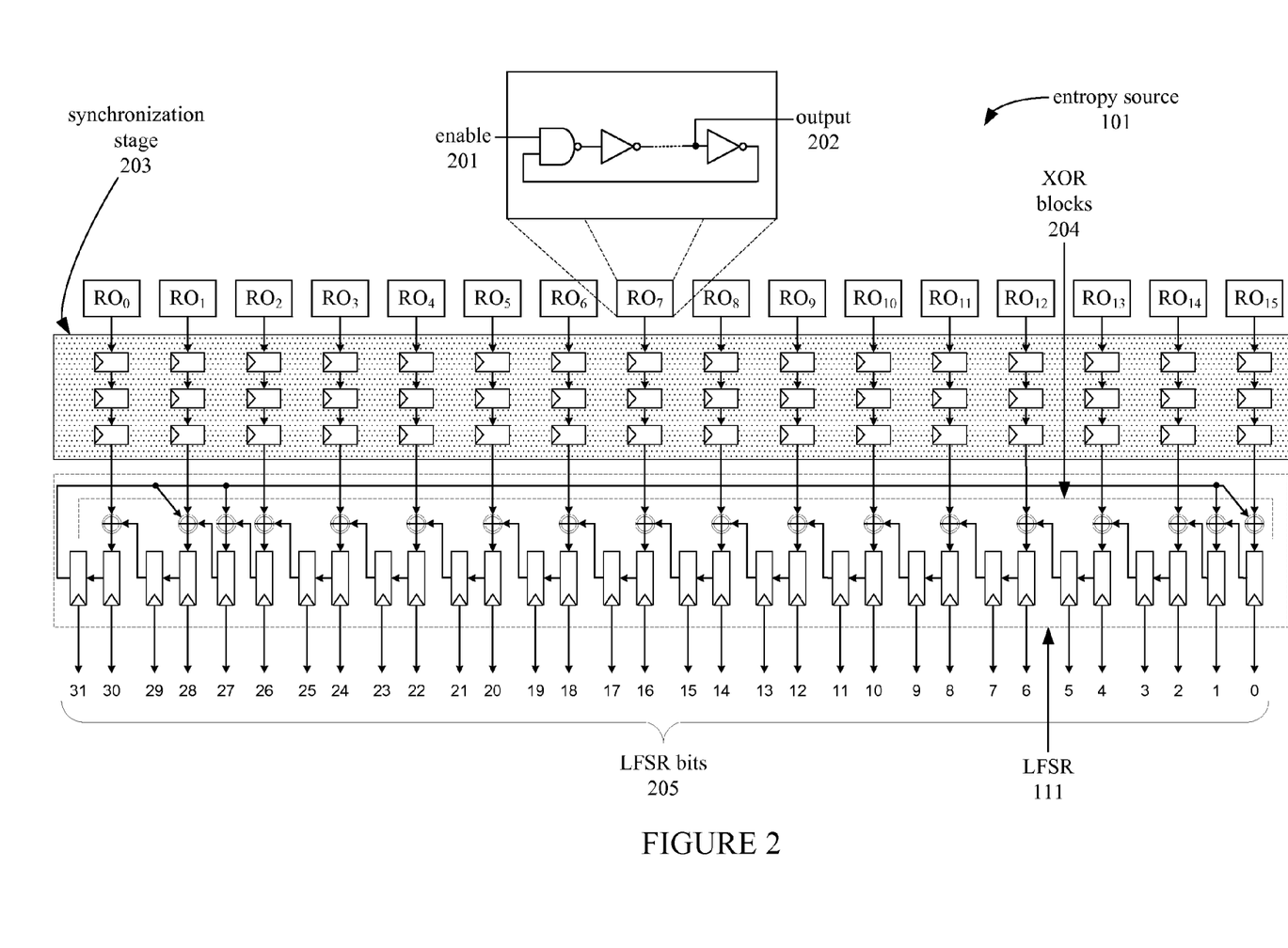
FIG. 2 illustrates an entropy source and a shift register of an entropy accumulator, according to one embodiment.

FIG. 2 illustrates an embodiment of an entropy source 101 for generating a number of entropy bits that may be used in a random number generator 100. Entropy source 101 includes a number of ring oscillators $RO_0$-$RO_{15}$. Each of the ring oscillators $RO_0$-$RO_{15}$ has an enable input for enabling the ring oscillator and resetting the output to zero so that the ring oscillator can be initialized in a known state. Each ring oscillator also has an output at which a random unsynchronized entropy bit is generated. Ring oscillator $RO_7$, for instance, has an enable input 201 for enabling or resetting the output 202 of ring oscillator $RO_7$.

In one embodiment, each of the ring oscillators $RO_0$-$RO_{15}$ may each be implemented as a chain of inverters. In one embodiment, the entropy source 101 may thus include 16 chains of inverters, as illustrated in FIG. 2. In one embodiment, the chains may be physically spread around an integrated circuit chip to ensure independent behavior.

In one embodiment, the outputs of $RO_0$-$RO_{15}$ may be synchronized by a synchronization stage 203. In one embodiment, the synchronization stage 203 may include flip-flop synchronizers with multiple stages, as illustrated in FIG. 2.

FIG. 2 also illustrates an embodiment of a LFSR 111 of the entropy accumulator 110. In one embodiment, the LFSR 111 includes a number of flip-flops each configured to store one of the LFSR bits 205. The LFSR bits 205 make up a seed value, and the entropy accumulator is configured to update this seed value based on the received entropy bits.

The synchronized entropy bits may be received at XOR blocks 204 via a 16-bit bus input. At the XOR blocks 204, an XOR operation may be performed for each of the received entropy bits and one of a subset of the bits 205 (i.e., the even numbered bits) already stored in the LFSR 111. In alternative embodiments, the XOR operation may be applied to only a subset of the entropy bits, or may be applied to all of the LFSR bits 205 or a different subset of the LFSR bits 205.

The LFSR 111 may accumulate entropy over time by shifting some of the LFSR bits 205 to adjacent bits at each clock cycle, while performing an XOR operation on other LFSR bits with entropy bits, before storing the XOR result in an adjacent bit. For example, with reference to FIG. 2, an XOR operation may be performed on bit 15 and an entropy bit from $RO_7$, and the XOR result is stored in bit 16. Bit 14 may be shifted to bit 15 without an XOR operation.

In one embodiment, the LFSR 111 may be run for at least 16 clock cycles to generate 32 bits of entropy. This enables the LFSR 111 to use at least 256 entropy bits to generate a 32-bit seed value. In an alternative embodiment, the LFSR 111 may be run for more than 16 clock cycles to generate a 32-bit output seed value, thus increasing the entropy of the output seed value.

In one embodiment, the entropy accumulator may maintain an "entropy valid" bit 115 for the seed value 114, and may set this valid bit 115 in response to determining that entropy has been allowed to accumulate in the LFSR 111 for a sufficient number of clock cycles so that the seed value 114 has sufficient entropy to be used as an initial DRBG seed. This valid bit 115 may be cleared when the ring oscillators $RO_0$-$RO_{15}$ are disabled, or if the health monitor 112 generates an entropy error.

In one embodiment, an entropy accumulation rate may be specified by a configuration setting that indicates the number of clock cycles for which the LFSR 111 is to be run before a seed value is output from the LFSR 111. In one embodiment, once the 32-bit seed value is generated based on the entropy accumulation rate setting, the seed value may be stored in a 384-bit shift register 113 by performing an XOR operation on the seed value bits and respective bits of the existing data in the shift register 113. For example, if the entropy accumulation rate is set to capture the LFSR seed value 114 after every 1024 clock cycles, then after each period of 1024 clock cycles, the LFSR 111 output will be XORed with 32 bits of the existing entropy vector in the shift register 113 (the 32-bit location may be selected by a counter).

In one embodiment, the seed value 114 output from the entropy accumulator 110 may be transmitted to the DRBG 120 and used by the DRBG 120 to generate the final random number. In one embodiment, the ring oscillators $RO_0$-$RO_{15}$ and the entropy accumulator 110 may be allowed to operate continuously, even when a new seed value is not needed, as this increases the accumulated entropy in future seed values. In one embodiment, a microcontroller may enable the entropy accumulation for a predetermined duration before enabling the DRBG 120 in order to accumulate additional entropy in the initial seed.

In one embodiment, the DRBG 120 is a NIST SP 800-90 compliant DRBG that uses 256-bit AES encryption to produce random numbers from the updated seed values provided by the entropy accumulator 110. In one embodiment, the control flow of the DRBG 120 for generating a random number 129 may be executed by controller logic 124 in DRBG 120. The random number 129 generated by the DRBG 120 may be stored in the random number FIFO 130. The random numbers stored in the FIFO 130 are the final random numbers which may then be provided to processes or entities requesting a random number.

Figure 3:
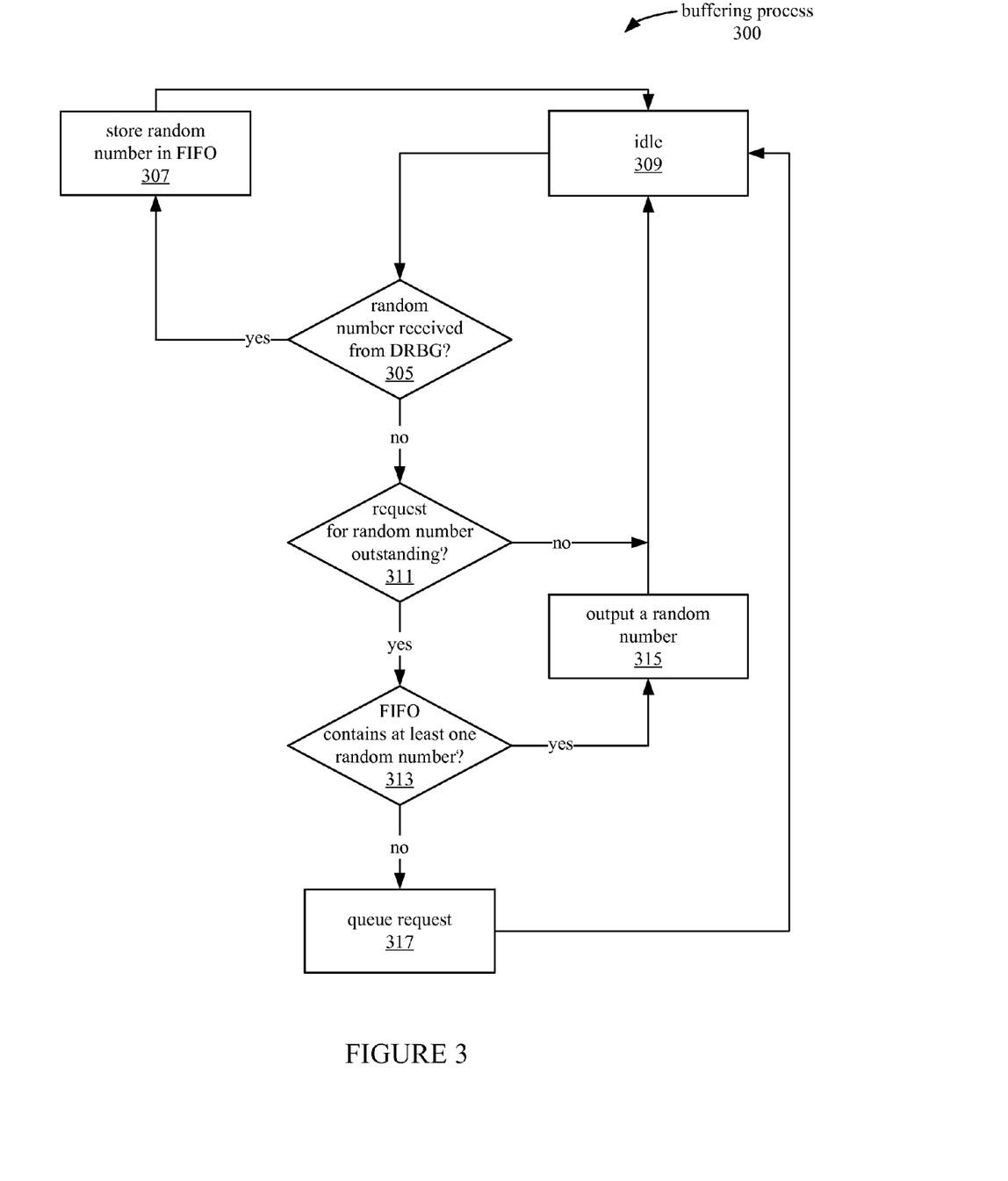
FIG. 3 is a flow diagram illustrating a buffering process for a random number generator, according to one embodiment.

FIG. 3 illustrates one embodiment of a process 300 that may be performed by a random number FIFO buffer 130. In one embodiment, if at block 305, the random number FIFO 130 has received a new random number from the DRBG 120, the process 300 continues at block 307, where FIFO 130 stores the random number before returning to the idle state 309. Otherwise, the process 300 may continue to block 311. If, at block 311, the FIFO 130 has received a request for a random number, the process may continue to block 313. Otherwise, the process 300 returns to the idle state 309. In one embodiment, if the random number FIFO 130 at block 313 contains at least one final random number, the FIFO 130 may output the final random number in response to the request for the random number, at block 315. If the random number FIFO 130 is empty at the time of the request, the FIFO 130 may queue the request at block 317 in order to wait until after a new final random number is generated and stored in the FIFO 130 before outputting the new final random number. In an alternative embodiment, if the random number FIFO 130 is empty at the time of the request, the FIFO 130 may take some other action, which could include returning a fixed value (e.g., 0).

Figure 4:
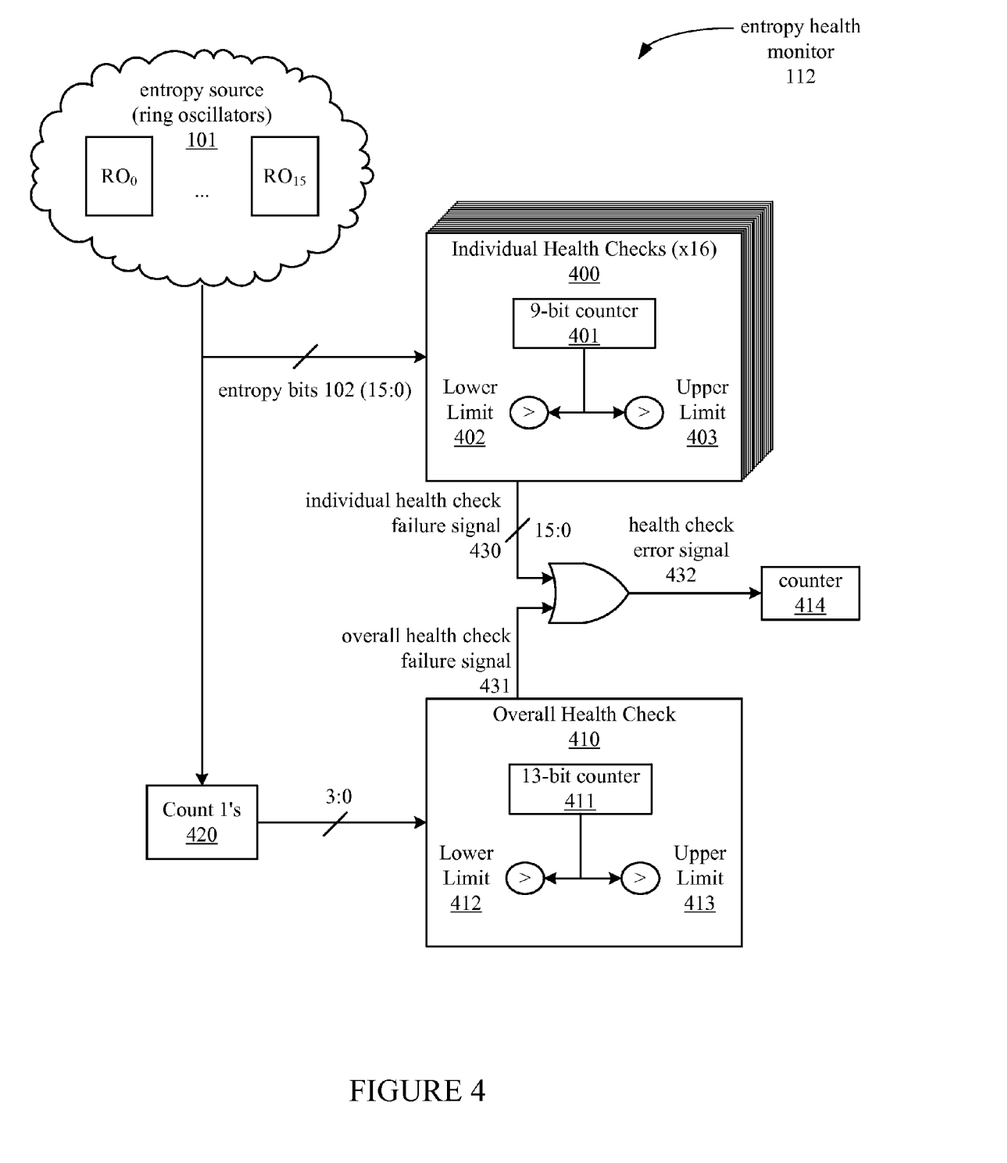
FIG. 4 illustrates an embodiment of an entropy health monitor.

FIG. 4 illustrates an entropy health monitor (EHM) 112, according to an embodiment. In one embodiment, EHM 112 may be implemented in entropy accumulator 110; alternatively, the EHM may be implemented as a separate module, or in another part of random number generator 100. The EHM 112 may be used to verify the quality of the input entropy 102 and identify potential attacks. In one embodiment, an external microcontroller that may be used to perform the initialization of the random number generator 100 may also perform functions in response to an entropy health error from the EHM 112.

Due to process variations or external factors, some ring oscillator chains may be slightly biased one direction or another. This bias may be mitigated by the entropy accumulator 110; however, if the entropy source becomes extremely biased, the low quality entropy would reduce the quality of the resulting final random numbers and could allow an attacker to predict the output of the DRBG 120.

In one embodiment, the output of each natural entropy source, such as a ring oscillator, may be treated as having a 50/50 chance of producing a 1 or 0 bit. Thus, in one embodiment, the EHM 112 may monitor the quality of the input entropy by determining whether a number of bits of the input entropy having a predetermined logic state (such as '1' or '0') exceeds at least one threshold value. For example, the EHM 112 may determine whether the number of ones or zeros exceeds an upper threshold or a lower threshold. In one embodiment, the upper and lower thresholds are programmable.

In one embodiment, the EHM 112 may receive synchronized entropy bits 102 from the entropy source 101. In one embodiment, the health check may be performed on the full set of input entropy bits 102, or may be performed on a subset of the input entropy bits. In one embodiment, the health check may be performed on a subset of the entropy bits that includes bits generated during a predetermined time interval called a monitoring window.

In one embodiment in which a "fixed" monitoring window is implemented, the EHM 112 may perform the health checks in regular intervals, such as every 256 random number generation cycles. In this case, at the end of each 256 cycles, the EHM 112 may record whether any health check fails for the entropy bits generated during the 256 cycles. In one embodiment, each fixed monitoring window does not overlap the previous monitoring window or the subsequent monitoring window.

In one embodiment, the EHM 112 may implement a "sliding" monitoring window by performing the health check on a subset of the entropy bits that includes a predetermined number of the most recently generated entropy bits. For example, each time the EHM 112 invokes the health check, the health check may be performed on the last 256 entropy bits generated by the entropy source 101. In one embodiment, such a health check may be performed every 256 random number generation cycles; alternatively, the health check may be performed more frequently or less frequently than every 256 cycles. In one embodiment, the health check may be performed every cycle. Thus, for a sliding monitoring window implementation, it is possible for a monitoring window to overlap with one or more previous or subsequent monitoring windows.

In one embodiment, the EHM 112 may include 16 individual health check blocks 400 and an overall health check block 410. Each individual health check block 400 may monitor individual entropy bits from each of the ring oscillators in the entropy source 101, while the overall health check block 410 may monitor the collective output of all of the ring oscillators. In one embodiment, the EHM 112 may concurrently perform both the individual health check and the overall health check on the entropy bits generated within the monitoring window.

One embodiment of an individual health check block 400 may identify a subset of entropy bits generated at a specific bit position during a monitoring window comprising a predetermined number of cycles. In one embodiment, the subset of monitored bits for an individual health check may be limited to a specific bit position of the entropy bits appearing within the monitoring window. In one embodiment, the specific bit position being monitored may correspond to a single ring oscillator.

In one embodiment in which a "fixed" monitoring window is implemented, at the end of the monitoring window, each individual health check block 400 compares the number of bits having the predetermined logic state to an upper limit threshold 403 and a lower limit threshold 402 to determine whether the number of bits having the predetermined logic state exceeds one of these thresholds and is outside an acceptable range. For example, the expected number of ones seen within 256 cycles may be a range represented by a lower limit of 104 and an upper limit of 152. In one embodiment, the upper and lower limits 403 and 402 may be chosen as a number of standard deviations above and below the expected mean value of 128. If the number of counted ones is within the acceptable range, the EHM 112 does not generate an error, but waits until the next cycle to restart the monitoring process for the next subset of bits. The monitoring window determines the subset of bits on which the health check is to be performed; thus, similar health checks may be performed by embodiments of EHM 112 regardless of whether a fixed monitoring window or a sliding monitoring window is used.

In one embodiment, the individual health check 400 may include a counter 401 that is connected to the input at which the entropy bits 102 are received. The counter 401 may be used to count the number of bits having a predetermined logic state that are included within the subset of entropy bits on which the health check is being performed. In one embodiment, the counter 401 may count the number of bits in the subset having a predetermined logic state (such as a '1' or a '0') received over a number of cycles within the monitoring window.

For example, the monitoring window may include 256 cycles, during which 256 sets of 16 entropy bits are generated by the entropy source 101. In one embodiment, the EHM 112 may include one individual health check block for monitoring each of the 16 entropy bits. Thus, each individual health check block 400 monitors the output of one ring oscillator. In one embodiment, the counter 401 may be a 9-bit counter that counts the number of ones generated by its corresponding ring oscillator during 256 cycles. Thus, for each cycle, the counter 401 may increment if the output of the ring oscillator for that cycle is a '1'.

In one embodiment, the bounds may be programmable even to the extent that the allowable variance in the ratio of ones to zeros can be set to 0, so that anything other than a perfect 50/50 split of ones and zeros would cause the health check to fail. In the above example where the lower limit is 104 and the upper limit is 152, the individual health check will fail if the number of ones generated by the ring oscillator after 256 cycles is less than 104 or greater than 152. In response to a health check failure, the individual health check block 400 may assert a corresponding bit in the 16-bit individual health check failure signal 430. In an embodiment of the EHM 112 that monitors for individual health check errors that persist over a number of consecutive cycles, a cycle counter may also be incremented in response to an individual health check failure.

In one embodiment, the EHM 112 may include an overall health check block 410 that performs a health check on the entropy bits collectively generated by all of the ring oscillators. The overall health check block 410 may include a counter 411 that counts the number of bits having a predetermined logic state (such as a '1' or '0') within a subset of bits including the bits that are generated within 256 cycles for all 16 bit positions of the ring oscillator output. Thus, for each cycle, the counter 420 may count the number of bits having the predetermined logic state within the 16 entropy bits generated during that cycle. As illustrated in FIG. 4, the counter 420 counts the number of ones generated by the entropy source 101. The 13-bit counter 411 may then accumulate the number counted by the counter 420 over the duration of the monitoring window, which may be, for example, 256 cycles.

If the number of ones counted by the counter 411 is within the acceptable range, the EHM 112 does not assert an error, and waits until the next cycle to restart the monitoring process for the next cycle. However, if the value counted by counter 411 is outside the range of expected values as represented by the lower limit 412 and upper limit 413, the overall health check failure signal 431 may be asserted, indicating that the overall health check has failed. For example, for an upper limit 412 of 1664 and a lower limit 413 of 2432, the failure signal 431 may be asserted when the number of ones generated over 256 cycles is less than 1664 or greater than 2432.

In one embodiment, the EHM 112 may trigger an error in response to detecting a health check failure that persists over a predetermined number of consecutive cycles. Such an error could indicate a deliberate attempt to tamper with the entropy source.

In one embodiment, the EHM 112 may include a counter 414 that tracks the number of health check failures that have occurred. Counter 414 may be incremented each time a health check failure occurs, and may be used initiate some corrective action upon reaching a maximum number of consecutive or non-consecutive health check errors. In one embodiment, the maximum number of health check errors may be programmable. In one embodiment, in response to reaching the maximum number of health check errors, the EHM 112 may initiate corrective action by generating an interrupt and/or setting a bit in a status register to indicate that the maximum number of health check errors has been reached.

In one embodiment, a health check error signal 432 may indicate whether any of the individual health check failure bits 430 or the overall health check failure 431 has been asserted. In one embodiment, repeated assertions of the health check error 432 by the EHM 112 may increment counter 414 beyond an error limit threshold, causing a corrective action to be performed. In one embodiment, the error limit may be set to "0", so that even a single health check error 432 may exceed the threshold and cause the corrective action to be taken. In one embodiment, the corrective action may include halting the generation of seed values 114 by the entropy accumulator, eventually causing the DRBG 120 to stall. Thus, in one embodiment, one or more assertions of the health check error 432 may inhibit the output of final random numbers generated by the DRBG 120. In an alternative embodiment, the output of final random numbers may be inhibited by causing the random number generator 100 to output a fixed value, or other deterministically generated value in response to a request for a random number. In one embodiment, this health check error condition persists until the EHM 112 is disabled or reset.

Figure 5:
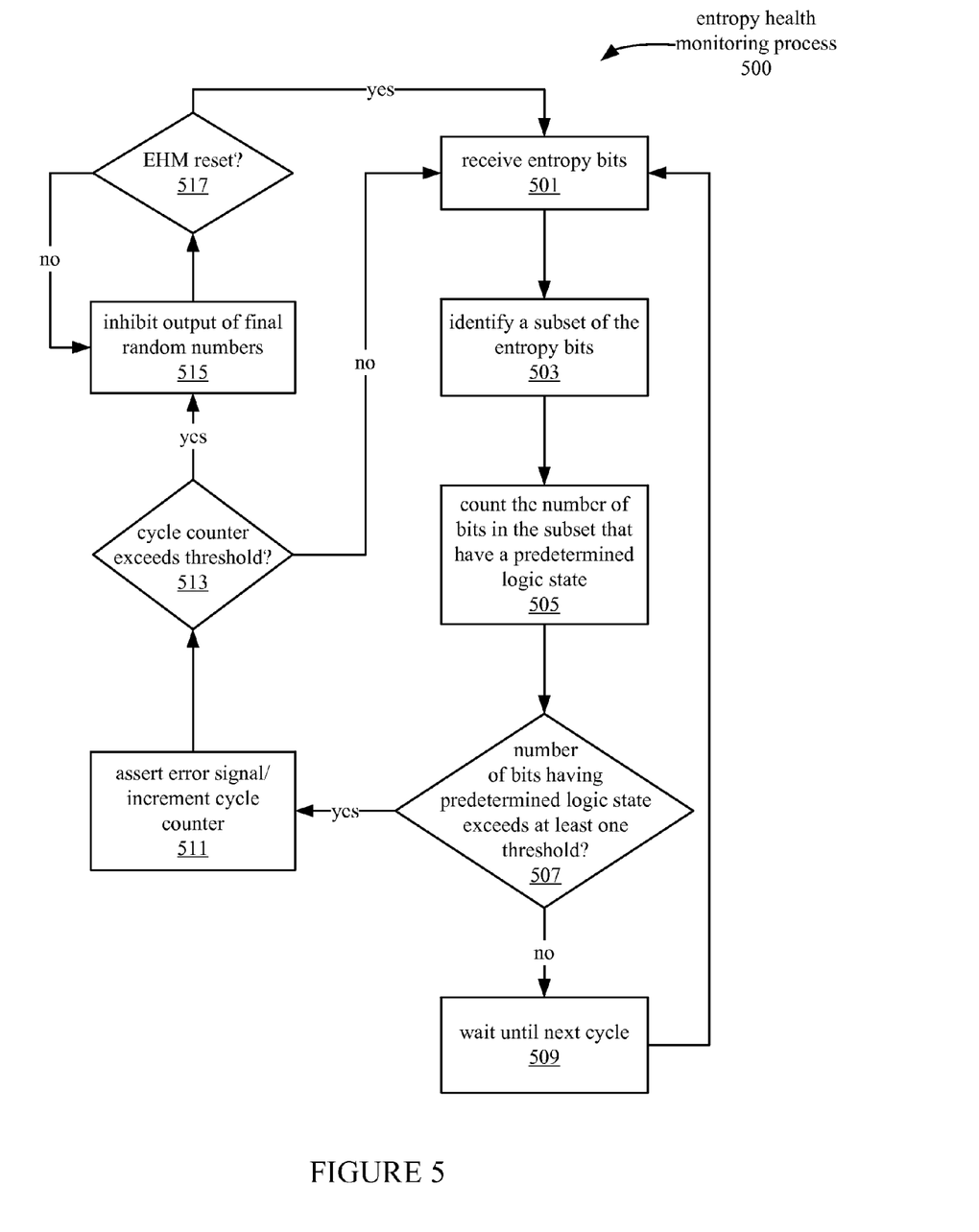
FIG. 5 is a flow diagram illustrating an entropy health monitoring process, according to one embodiment.

FIG. 5 illustrates an entropy health monitoring process 500 that may be executed by the EHM 112. At block 501 of the entropy health monitoring process 500, the EHM 112 may receive synchronized entropy bits 102 from the entropy source 101. From block 501, the process 500 continues at block 503.

At block 503, the EHM 112 may identify a subset of entropy bits to be monitored. For instance, the EHM 112 may identify a subset of entropy bits generated within a monitoring window as the subset of entropy bits on which the health check will be performed. In one embodiment, the monitoring window used to identify the subset of entropy bits may be a fixed monitoring window. Alternatively, the monitoring window may be a sliding monitoring window. From block 503, the process 500 continues at block 505.

At block 505, the EHM 112 counts the number of bits in the subset of entropy bits that have a predetermined logic state. In one embodiment, the counting may be performed by the counter 401 in the individual health check block 400, and counters 420 and counter 411 in the overall health check block 410. From block 505, the process 500 continues at block 507.

At block 507, the EHM 112 determines whether the number of bits having the predetermined logic state exceeds at least one threshold. In the individual health check block 400, the value from counter 401 may be compared to the lower limit 402 and the upper limit 403. For the overall health check 410, the value from counter 411 may be compared to the lower limit 412 and the upper limit 413. If, at block 507, the number of bits having the predetermined logic state does not exceed at least one of the thresholds for either of the health checks, the process 500 continues at block 509. At block 509, the EHM 112 does not assert an error and waits until the next cycle to continue monitoring.

If, at block 507, the number of bits having the predetermined logic state exceeds at least one of the thresholds, the process 500 continues at block 511. At block 511, the EHM 112 asserts an error signal. For example, the EHM 112 may assert an individual health check failure signal 430 when the counter value of counter 401 exceeds either the lower limit 402 or the upper limit 403. The EHM 112 may assert an overall health check failure signal 431 when the counter value of counter 411 exceeds either the lower limit 412 or the upper limit 413. The EHM 112 at block 511 may also increment a cycle counter 414 that counts the number of errors occurring within the cycle if either of the failure signals 430 or 431 are asserted. From block 511, the process 500 continues at block 513.

At block 513, if the cycle counter 414 does not exceed a threshold defined by an error limit, the process 500 continues back to block 501 to receive the next set of entropy bits for health monitoring. If, at block 513, the cycle counter 414 exceeds the error limit, the process 500 continues at block 515.

At block 515, the EHM 112 may take some corrective action in response to the excessive number health check errors, such as inhibiting the output of the final random numbers, setting a bit in a status register, or generating an interrupt. In one embodiment, the EHM 112 may inhibit the output of final random numbers by causing the output of a fixed value (such as 0) instead of a random number. In an alternative embodiment, the EHM 112 may inhibit the output of the final random numbers by causing a request for a random number to be queued until the health monitoring errors are cleared. From block 515, the process 500 continues to block 517.

At block 517, if the EHM 112 has not been reset, then the process 500 continues back to block 515, where the EHM 112 may continue to perform the corrective action. If, at block 517, the EHM has been reset, the process 500 continues back to block 501 to restart health monitoring for the next set of entropy bits.

Figure 6:
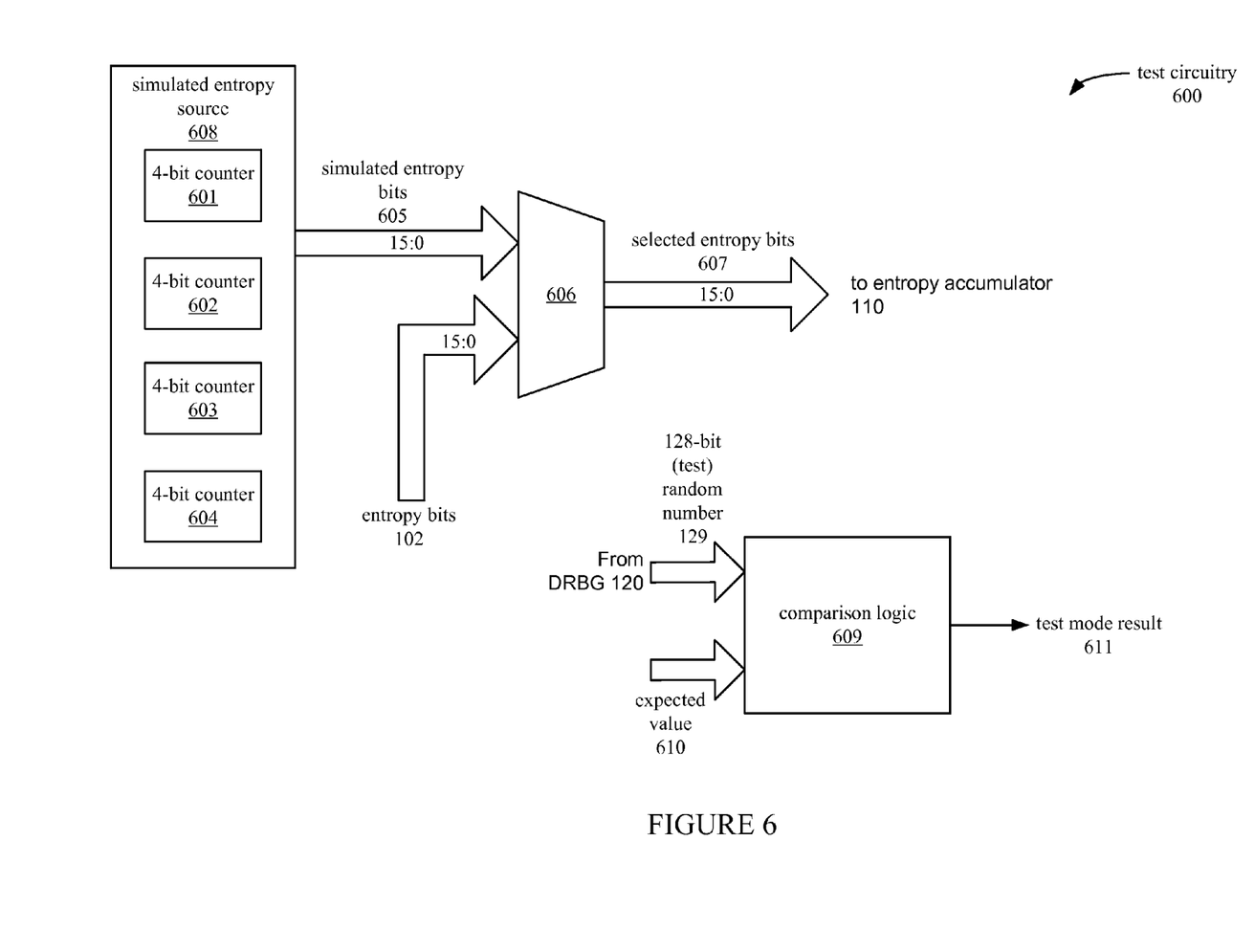
FIG. 6 illustrates test circuitry for a random number generator, according to one embodiment.

In one embodiment, the random number generator 100 supports a test mode for verifying correct functional operation of the entropy accumulator 110 and the DRBG 120. FIG. 6 illustrates test circuitry 600 for a random number generator 100, according to an embodiment. When in the test mode, the random number generator 100 may switch the input of the entropy accumulator 110 to receive 16 simulated entropy bits 605 from a simulated entropy source 608 that generates the simulated entropy bits using four counters 601-604. In one embodiment, each of the counters 601-604 may be a 4-bit free running counter that increments starting at 0. In one embodiment, each counter may generate four adjacent bits of the 16 entropy bits. Thus, counter 601 may generate bits [3:0], counter 602 may generate bits [7:4], counter 603 may generate bits [11:8], and counter 604 may generate bits [15:12]. In alternative embodiments, the simulated entropy source 608 may generate the simulated entropy bits 605 using other types of counters, look-up tables, or other devices for deterministically generating bits. In one embodiment, a multiplexer 606 may be used to select the simulated entropy bits 605 instead of the entropy bits 102 when the random number generator 100 is operating in test mode.

In one embodiment, the selected entropy bits 607 which are selected by the multiplexer 606 are transmitted to the entropy accumulator 110. The entropy accumulator 110 and the DRBG 120 operate as previously described, to deterministically generate an output random number 129 based on the deterministically generated simulated entropy bits; thus the random number 129 is not a "true" random number, but is a predictable test random number. In one embodiment, this test random number 129 from the output of DRBG 120 may be received by comparison logic 609, which compares the test random number 129 with an expected value 610 corresponding to the test random number 129. In one embodiment, the expected value 610 may be calculated based on the same inputs (such as simulated entropy bits 605) used for generating the corresponding test random value 129.

Figure 7:
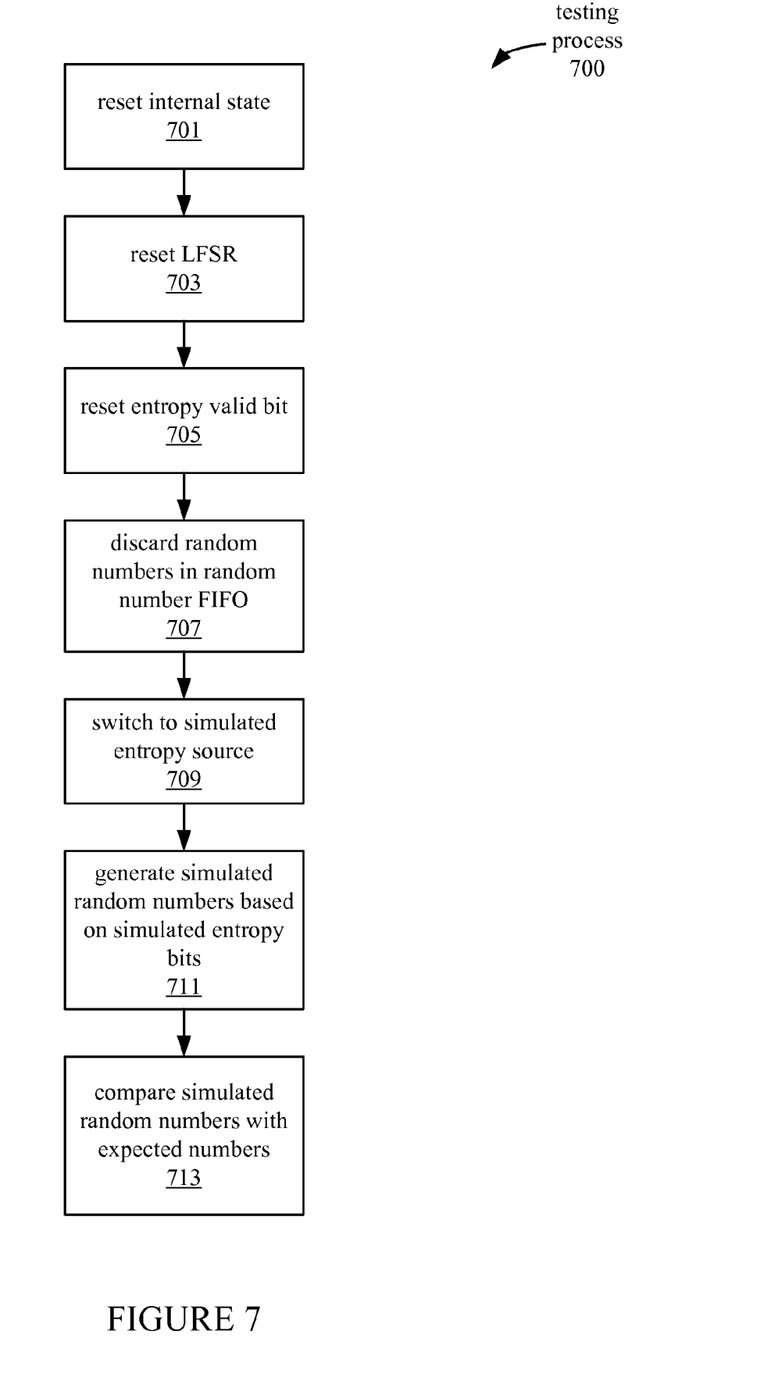
FIG. 7 illustrates a testing process for a random number generator, according to one embodiment.

By using a deterministic simulated entropy source, this known-value testing can be done during the test mode to verify the functionality of the entropy accumulator 110 and the DRBG 120. In one embodiment, the test mode may be enabled by setting a test mode configuration bit. When the test mode is enabled, the random number generator 100 may perform a testing process 700 as illustrated in FIG. 7, according to one embodiment.

In one embodiment, upon entering the test mode, the process 700 at block 701 resets the internal state of the random number generator 100. In one embodiment, this resetting of state may be similar to a cold reset, or power-on reset. From block 701, the process 700 continues at block 703. At block 703, the LFSR 111 may be reset. In one embodiment, the LFSR 111 may be reset to a standard reset value. For example, a 32 bit LFSR may be reset to the value to all ones. From block 703, the process 700 continues at block 705. At block 705, the process 700 may reset the entropy valid bit to 0. From block 705, the process 700 continues at block 707. At block 707, the process 700 discards random numbers already present in the random number FIFO 130. From block 707, the process 700 continues at block 709.

At block 709, the process 700 switches the input of the entropy accumulator 110 to receive simulated entropy bits 605 from the simulated entropy source 608, as illustrated in FIG. 6, instead of receiving entropy bits 102 from the entropy source 101. In one embodiment, the switch may be performed via multiplexer 606. From block 709, the process 700 continues at block 711.

At block 711, the random number generator 100 performing process 700 generates simulated random numbers based on the simulated entropy bits 605 received from the simulated entropy source 608. In one embodiment, the generation of simulated random numbers may be a deterministic process as performed by the entropy accumulator 110 and the DRBG 120, such that the simulated random numbers can be predicted based on the simulated entropy bits 605 and the known operational parameters of the entropy accumulator 110 and the DRBG 120. In one embodiment, the entropy accumulator 110 and DRBG 120 perform the same operations on the simulated entropy bits 605 as would normally be performed on randomly generated entropy bits 102.

The entropy accumulator 110 may generate a deterministic seed based on the received simulated entropy bits 605. In one embodiment, disabling and re-enabling the DRBG 120 causes the DRBG 120 to receive the deterministic seed from the entropy accumulator 110. In one embodiment, the DRBG 120, entropy accumulator 110, and test mode are enabled simultaneously or at known times to avoid differences in timing from affecting the generated simulated random numbers.

In one embodiment, the simulated random numbers may be output from DRBG 120 to comparison logic 609, where each simulated random number 129 may be compared with a corresponding expected value 610, in accord with block 713 of process 700. The comparison logic 609 may assert a test mode result signal 611 to indicate whether the simulated random number 129 matches its expected value 610. Test result 611 may indicate whether the entropy accumulator 110 and DRBG 120 are functioning as expected. To exit the test mode, the random number generator 100 may be disabled and re-enabled.

In one embodiment, the EHM 112 may continue to operate while in test mode. Both the individual health checks and overall health checks will pass, since the counters 601-604 should generate an equal proportion of ones and zeros.

The embodiments described herein may include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the random number generator 100 and/or portions thereof carried on the computer-readable storage medium may be a database or other data structure which can be read by a program and used, directly or indirectly, to fabricate the hardware comprising the random number generator 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the random number generator 100. The netlist may then be placed and routed to produce a data set describing geometric shapes to be applied to masks. The masks may then be used in various semiconductor fabrication steps to produce a semiconductor circuit or circuits corresponding to the random number generator 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. An apparatus, comprising:
an input configured to receive a plurality of entropy bits generated by an entropy source of a random number generator, wherein the random number generator is configured to generate a plurality of random numbers; and
a hardware entropy health monitor coupled with the input, wherein the entropy health monitor comprises:
a plurality of health check blocks, wherein a first health check block of the plurality of health check blocks is configured to generate a first health check error based on a subset including fewer than all of the plurality of entropy bits, and wherein a second health check block of the plurality of health check blocks is configured to generate a second health check error based on all of the plurality of entropy bits, and
an error counter configured to store a number of health check errors generated by the plurality of health check blocks, wherein the entropy health monitor is configured to perform a corrective action in response to the number of health check errors exceeding an error limit.

2. The apparatus of claim 1, wherein the first health check block comprises a counter coupled with the input, wherein the counter is configured to determine a number of bits having a predetermined logic state within the subset of the plurality of entropy bits, and wherein the first health check block is further configured to assert an error signal in response to the number of bits having the predetermined logic state exceeding at least one threshold.

3. The apparatus of claim 2, wherein the subset of the plurality of entropy bits includes bits generated during a predetermined time interval.

4. The apparatus of claim 2, wherein the subset of the plurality of entropy bits includes a predetermined number of the most recently generated entropy bits.

5. The apparatus of claim 1, wherein the corrective action comprises generating an interrupt signal.

6. The apparatus of claim 1, wherein the corrective action comprises inhibiting the output of at least one of the plurality of random numbers by the random number generator.

7. The apparatus of claim 6, wherein the entropy health monitor is configured to inhibit the output of random numbers by causing the random number generator to stop generating random numbers.

8. The apparatus of claim 6, wherein the entropy health monitor is configured to inhibit the output of random numbers by causing the random number generator to output a deterministically generated value in response to a request for a random number.

9. A hardware random number generator, comprising:
an entropy source configured to generate a plurality of entropy bits;
an entropy accumulator coupled with the entropy source, wherein the entropy accumulator is configured to update a seed value based on the plurality of entropy bits;
a deterministic random bit generator coupled with the entropy accumulator, wherein the deterministic random bit generator is configured to generate one or more final random numbers based on the updated seed value; and
an entropy health monitor coupled with the entropy source, wherein the entropy health monitor comprises:
a plurality of health check blocks, wherein a first health check block of the plurality of health check blocks is configured to generate a first health check error based on a subset including fewer than all of the plurality of entropy bits, and wherein a second health check block of the plurality of health check blocks is configured to generate a second health check error based on all of the plurality of entropy bits, and
an error counter configured to store a number of health check errors generated by the plurality of health check blocks, wherein the entropy health monitor is configured to perform a corrective action in response to the number of health check errors exceeding an error limit.

10. The hardware random number generator of claim 9, wherein the first health check block comprises a counter coupled with the input, wherein the counter is configured to determine a number of bits having a predetermined logic state within the subset of the plurality of entropy bits, and wherein the health check block is further configured to assert an error signal when the number of bits having the predetermined logic state exceeds at least one threshold.

11. The hardware random number generator of claim 10, wherein the subset of the plurality of entropy bits includes a predetermined number of the most recently generated entropy bits.

12. The hardware random number generator of claim 9, wherein the entropy health monitor is configured to perform the corrective action by causing the random number generator to stop generating random numbers.

13. The hardware random number generator of claim 9, wherein the entropy health monitor is configured to perform the corrective action by causing the random number generator to output a fixed number in response to a request for a random number.

14. The hardware random number generator of claim 9, further comprising:
a simulated entropy source configured to generate a plurality of simulated entropy bits; and
comparison logic coupled with the deterministic random bit generator, wherein the comparison logic is configured to compare an expected value corresponding to the plurality of simulated entropy bits with a resulting test random value, wherein the deterministic random bit generator is configured to generate the test random value based on the plurality of simulated entropy bits.

15. The hardware random number generator of claim 9, wherein for each entropy bit, the entropy accumulator is configured to perform an XOR operation on the entropy bit and one of the bits in the seed value stored in the entropy accumulator, and wherein the entropy accumulator comprises a plurality of flip-flops each configured to store a bit of the seed value, and wherein at least one of the plurality of flip-flops is further configured to transfer the bit stored in the at least one of the plurality of flip-flops to another of the plurality of flip-flops.

16. A method of generating a random number, comprising:
receiving from an entropy source a plurality of entropy bits;
generating a plurality of final random numbers based on the plurality of entropy bits;
generating a first health check error based on a subset including fewer than all of the plurality of entropy bits;
generating a second health check error based on all of the plurality of entropy bits; and
in response to a number of the health check errors generated exceeding an error limit, inhibiting output of at least one of the plurality of final random numbers based on the plurality of entropy bits.

17. The method of claim 16, further comprising performing the inhibiting based on whether a number of bits having a predetermined logic state within the subset of the plurality of entropy bits exceeds at least one threshold.

18. The method of claim 17, further comprising identifying a predetermined number of most recently generated entropy bits as the subset of the plurality of entropy bits.

19. The method of claim 16, wherein inhibiting the output of the at least one of the plurality of final random numbers further comprises outputting a deterministically generated value in response to a request for a random number.

20. The method of claim 16, further comprising:
storing in a buffer the plurality of final random numbers; and
in response to receiving a request for a random number, when the buffer is storing at least one of the plurality of final random numbers, outputting one of the plurality of final random numbers, and when the buffer is empty, outputting a new random number of the plurality of final random numbers after the new random number is stored in the buffer.

* * * * *